(12) United States Patent
Baird et al.

(10) Patent No.: US 7,551,573 B2
(45) Date of Patent: Jun. 23, 2009

(54) METHOD AND SYSTEM FOR MAINTAINING VIDEO CONNECTIVITY

(75) Inventors: Randall B. Baird, Austin, TX (US);
Connie M. S. Tang, Sunnyvale, CA (US); Francis P. Viggiano, Palo Alto, CA (US); Thiyagesan Ramalingam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 616 days.

(21) Appl. No.: 11/137,028

(22) Filed: May 25, 2005

(65) Prior Publication Data

US 2006/0268751 A1 Nov. 30, 2006

(51) Int. Cl.
*H04L 12/16* (2006.01)
*H04Q 11/00* (2006.01)
*H04N 7/14* (2006.01)

(52) U.S. Cl. ............... 370/260; 348/14.01; 348/14.08; 348/14.09

(58) Field of Classification Search ......... 370/260–262, 370/401; 348/14.08, 14.09, 14.01; 379/88.22
See application file for complete search history.

(56) References Cited

U.S. PATENT DOCUMENTS

| | | | |
|---|---|---|---|
| 6,037,932 A | 3/2000 | Feinleib | 345/327 |
| 6,400,720 B1 | 6/2002 | Ovadia et al. | 370/395.64 |
| 6,646,997 B1 * | 11/2003 | Baxley et al. | 370/260 |
| 7,023,851 B2 | 4/2006 | Chakravorty | 370/392 |
| 7,053,923 B1 * | 5/2006 | Hamilton | 348/14.08 |
| 2001/0005372 A1 * | 6/2001 | Cave et al. | 370/401 |
| 2002/0044553 A1 | 4/2002 | Chakravorty | 370/392 |
| 2002/0067730 A1 | 6/2002 | Hinderks et al. | 370/395.52 |
| 2002/0071432 A1 | 6/2002 | Soderberg et al. | 370/389 |
| 2004/0022202 A1 * | 2/2004 | Yang et al. | 370/261 |
| 2006/0045021 A1 * | 3/2006 | Deragon et al. | 370/249 |
| 2006/0047749 A1 * | 3/2006 | Davis et al. | 709/204 |
| 2006/0193452 A1 * | 8/2006 | Erhart et al. | 379/88.22 |

OTHER PUBLICATIONS

IETF Network Working Group, RFC 3550 RTP: A Transport Protocol for Real-Time Applications, Jul. 2003, IETF, 4, 13-16.*

* cited by examiner

*Primary Examiner*—Ahmad F Matar
*Assistant Examiner*—Sonia Gay
(74) *Attorney, Agent, or Firm*—Baker Botts L.L.P.

(57) ABSTRACT

According to one embodiment of the invention, a method for maintaining video capability includes receiving at a device from a source a plurality of packets representative of video data. The plurality of packets include a payload and a header. The method also includes transmitting a copy of the plurality of received packets back to the source with a modified header and an unmodified payload. The transmitted copy provides data representative of the video data.

41 Claims, 3 Drawing Sheets

METHOD AND SYSTEM FOR MAINTAINING VIDEO CONNECTIVITY

TECHNICAL FIELD OF THE INVENTION

This invention relates generally to video connectivity and more particularly to a method and system for maintaining video connectivity.

BACKGROUND OF THE INVENTION

Video conferencing is becoming increasingly popular in today's society. The advent of the internet has resulted in video conferencing capability through the internet. Interactive voice response systems (IVRs) are also prevalent. However, the combination of IVRs with video conferencing facility may cause some difficulties.

SUMMARY

According to one embodiment of the invention, a method for maintaining video capability includes receiving at a device from a source a plurality of packets representative of video data. The plurality of packets include a payload and a header. The method also includes transmitting a copy of the plurality of received packets back to the source having a modified header and an unmodified payload. The transmitted copy provides data representative of the video data.

Embodiments of the invention may provide numerous technical advantages. Some, none, or all embodiments of the invention may include the below-listed advantages. According to one embodiment, a method and system are provided that allow a video endpoint to maintain video connectivity without requiring extensive use of processing resources. This may be achieved, in one embodiment, by reflecting back received packets of video data, rather than composing a new video image. By maintaining video connectivity, such a video endpoint may receive further video communications, even if the device to which it is connected does not have video processing capability.

Other advantages will be readily apparent to one of skill in the art.

BRIEF DESCRIPTION OF THE FIGURES

For a more complete understanding of the present invention and its advantages, references now made to the following description, taken in conjunction with the accompanying drawings, in which.

DETAILED DESCRIPTION OF EXAMPLE EMBODIMENTS

Figure 1A:
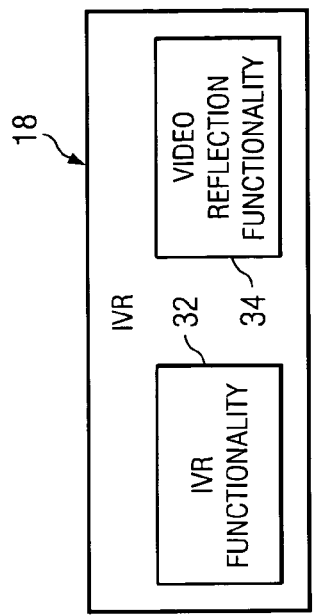
FIG. 1A is a schematic diagram illustrating a video conference system according to the teachings of the invention.

Embodiments of the present invention and its advantages are best understood by referring to FIGS. 1 through 4 of the drawings, like numerals being used for like and corresponding parts of the various drawings.

The teachings of the invention recognize that when video IP endpoints connect to IVR systems the lack of video support in the IVR often fools the endpoint into thinking that video will not be supported through the duration of the call, even if a subsequent transfer to a video-capable system is performed. An example of this is a video endpoint dialing into a conferencing system where an ID or other identifying information must be entered before the participant can be sent to the video conference. Another problem is that it may be useful to provide the end user with visual feedback that his video is connected properly, even if the video endpoint device is capable of connecting video subsequent to completing the IVR session. The teachings of the invention recognize that to solve this problem the IVR system must implement some sort of video source during the interactive voice response portion of the communication. This may be difficult because such video sources can be complex and expensive and the management of even simple content becomes challenging in a system where many different video encodings, form factors, frame rates, and bit rates are supported.

According to the teachings of the invention certain embodiments are described that provide a low cost video output that cause video endpoints to believe they are in a video conference mode while using the video endpoints own source stream, and to provide visual feedback to the user of the video endpoint that the video has been successfully connected. Example embodiments are illustrated with respect to FIGS. 1 through 6.

FIG. 1 is a schematic diagram illustrating a video conferencing system 10 according to the teaching of the invention. Video conferencing system 10 includes video conference terminals 12 and 14. Video conference terminals 12 and 14 communicate with a multi-point control unit 16, which generally controls communications between video conference terminals, receiving packets representative of video data and transmitting them to the appropriate video conference terminal. Although only two video conference terminals are illustrated in this example for simplicity, it will be understood that more than two video conference terminals may be connected to multi-point control unit 16.

In some implementations, it may be desirable to use an interactive voice response system, such as interactive voice response system 18, to initially handle video conferencing traffic from a particular video conference terminal 12, 14. Once video conferencing is taking place, video conference terminal 12 may communicate with multi-point control unit 16 over communication link 24. In this situation, video conference terminal 12 communicates first the IVR 18, as indicated by reference numeral 20. IVR 18 collects information from the end-user until it has enough information to effect a transfer of the audio, video, and other data streams to the MCU 16. This transfer may be accomplished through a variety of signaling methods. Once video conferencing is taking place, the audio, video, and other data streams flow directly between the video terminal 12 and the MCU 16, as illustrative by communication link 24. It will be understood that links 20, 24 and 26 may be representative of a plurality of internet connections, or other connections that provide a transmission conduit for packet data.

Video conference terminals 12 and 14 may, in one embodiment, include a camera and processing capabilities operable to produce data representative of a plurality of images or video frames captured by the camera and transmit a plurality of packets representative of the produced data. In addition, video conference terminals 12, 14 may include functionality operable to render a plurality of images or video frames on a screen in response to receiving a plurality of packets representative of a video image. The transmission of such data may involve compressing the video data, packetizing the video data to Real Time Transport Protocol, or other suitable protocol. Real Time Transport Protocol (RTP) specifies a way for programs to manage real time transmission of multimedia data over either unicast or multicast network services. Conversely, rendering a video image on a screen may involve decompressing received packets representative of video data, and rasterizing the packets for display on a screen. Examples of commercially available video conference terminals include Cisco Video Telephony Advantage, Microsoft Messenger, and video conference terminals available from Radvision and France Telecom, as well as those available from Tandberg and Polycom.

Multi-point control unit 16 may have the capability of receiving packetized video data, decoding each packet, rasterizing and composing new packets representative of the video data from multiple locations, recompressing the data into packet form, and/or transmitting the packet data out to a plurality of locations for receipt by a plurality of video conferencing terminals. One example of a conventional multi-point control unit is Cisco IPVC. It should be understood that although multi-point control unit 16 is represented by a single box in FIG. 1A, that it could be implemented by a single device or a plurality of separate devices connected together as a distributed system.

Interactive voice response unit (IVR) 18 may include conventional functionality associated with IVRs. This functionality may include receiving packetized data, offering a plurality of options to the user, and respond to a user's response to the options. According to the teachings of the invention, IVR 18 may also be included with functionality for maintaining video connectivity, as described in greater detail below.

Communications over lines 20, 24, and 26 may take place according to RTP protocol; however other protocols may be used. In addition, certain protocols may be used in establishing these communications including H.323 and SIP.

Figure 1B:
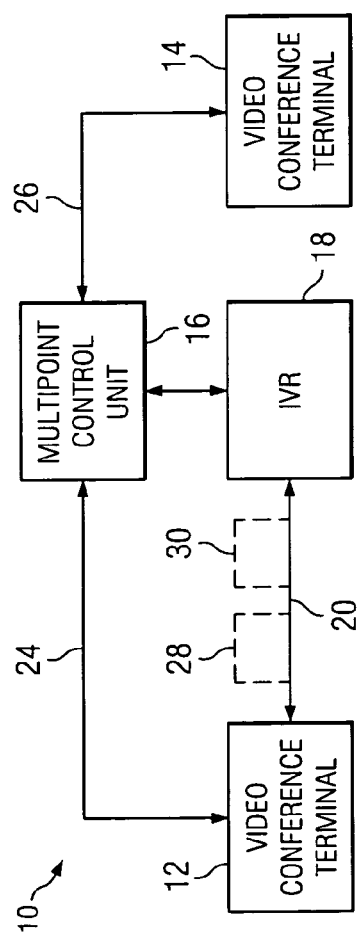
FIG. 1B is a block diagram illustrating the interactive voice response unit of FIG. 1.

FIG. 1B is a block diagram illustrating IVR 18 according to the teachings of the invention. In this embodiment IVR 18 includes conventional IVR functionality block 32. In addition, IVR 18 includes a video reflection functionality block 34. Video reflection functionality block 34 allows video conferencing terminal 12 to maintain video connectivity even if IVR 18 does not possess video processing capability. It should be noted. that, in some instances, the video reflection capability and the IVR capability can be hosted in completely separate packaging. This means that the reflector can be an add-on to a commercially available IVR. In one embodiment, video reflection functionality block 34 is operable to respond to a query regarding the video processing capabilities of IVR 18. Certain protocols such as SIP and H.323 conventionally involve setup communications that inquire into the video processing capability of a particular device, if it is anticipated that video data in the form of one or more RTP streams will be transmitted. Video reflection functionality block 34 may respond to such a request in the affirmative, whether or not IVR 18 (or other device) is capable of processing video data. This functionality accommodates certain protocols that will disable the video capability of video conference terminal 12 in response to failure to receive indication of video processing capability by IVR 18. The above-described functionality of video reflection functionality block 34 may be omitted in some embodiments. In addition, video reflection functionality block 34 also includes functionality for modifying received video packets and returning them to a video endpoint server, as described in greater detail below. Video reflection functionality block 34 may be implemented in hardware, software, firmware, or in other suitable manners. According to one embodiment, video reflection functionality block 34 is implemented as software encoded in media, such as RAM, ROM, or other suitable media. It will be understood that IVR systems according to the teachings of the invention may include conventional IVRs in combination with the above-discussed video reflection functionality.

Figure 1C:
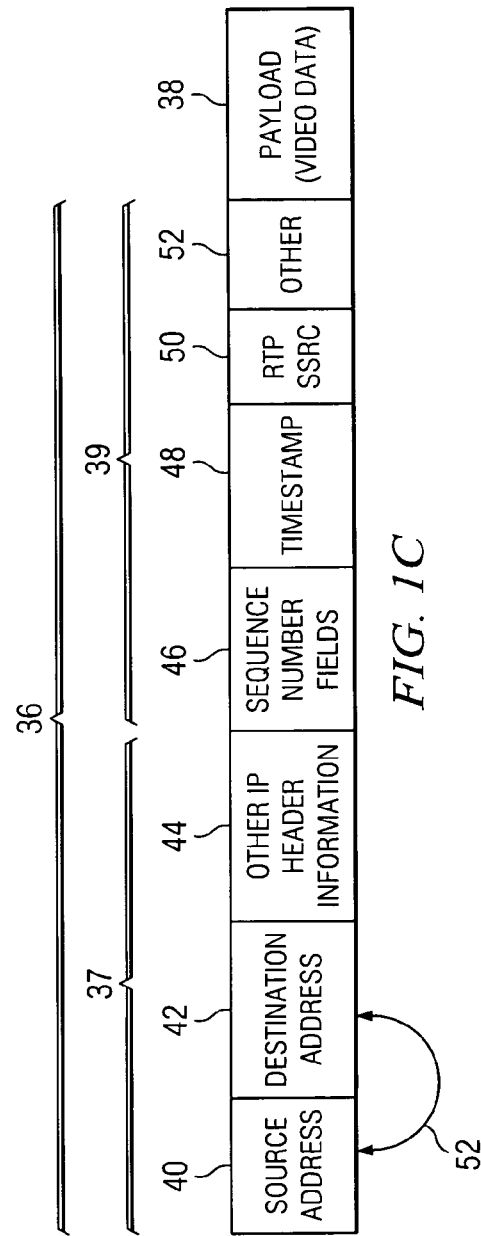
FIG. 1C is an example packet that is transmitted in the system of FIG. 1.

FIG. 1C is a block diagram illustrating example details associated with packet 28 and packet 30 according to the teachings of the invention. As described above, according to one embodiment of the invention packets are transmitted over links 20, 24, and 26. FIG. 1C illustrates details associated with one example packet. In this example, packet 28, 30 includes a header portion 36 and a payload portion 38. Header portion 36 includes an IP header 37 and an RTP header 39. Other header information not pertinent to the present disclosure may also be included in some embodiments, such as a UDP header. IP header 37 includes a source address 40, which stores the IP address at the source of the packet, and a destination address 42, which stores the IP address of the destination of the packet. IP header 37 also includes other header information not pertinent to the present disclosure. RTP header 39 includes sequence number fields 46, which are used by the RTP receiver to identify missing or duplicated packets, a time stamp 48, which stores the time at which the packet was transmitted, and an SSPC 50, which is an RTP synchronization source identifier acting as a unique identifier for the RTP stream. Other header information 52 may include additional header information. Although particular portions of packet 28, 30 are illustrated for clarity of description, it will be understood that other alternative items may be included within packet 28, 30. Payload portion 38 contains the underlying data contained within packet 28, 30. In the present example, payload 38 includes data indicative of a video image.

As described in greater detail below, according to one embodiment, when packet 28 is received by IVR the source address and destination addresses are exchanged creating packet 30, and a unique SSRC is generated. The unique SSRC makes sure that the video system does not realize that it is receiving its own stream, which might cause it to drop it. Packet 30 is in turn transmitted back to video conference terminal 12 without modification of payload 38. This allows video conference terminal 12 (FIG. 1A) to present a video image, even if IVR 18 is not capable of processing video data. In one embodiment, the inability to rasterize video data contained in the payload of a packet makes the device incapable of processing video data.

Referring to FIGS. 1A-1C, according to the teachings of the invention IVR 18 receives packets of video data, one of which is illustrated as packet 28 in FIG. 1A. In response, IVR 18 simply transmits back video data packets to video conference terminal 12 without modification of the underlying video data. This allows video conference terminal 12 to see video data on its associated display rather than a blank screen. Further, by receiving video data back, as well as indication that IVR 18 is capable of processing video data, subsequent communications over line 24 will have video capability enabled. Often, if a video conference terminal 12 were to connect to a multi-point control unit through an IVR, the inability of the IVR to process video data would result in the video capability associated with video conference terminal 12 being disabled, according to some protocols. This reflection back of video data therefore allows for maintaining video connectivity of a video conference terminal in a fairly inexpensive manner. It should be understood that the reflection back of data packets may occur by a device other than an IVR, including devices that have actual video data processing capability, as well as in contexts that do not utilize a multipoint control unit. Example details associated with example implementations are described below.

Figure 2:
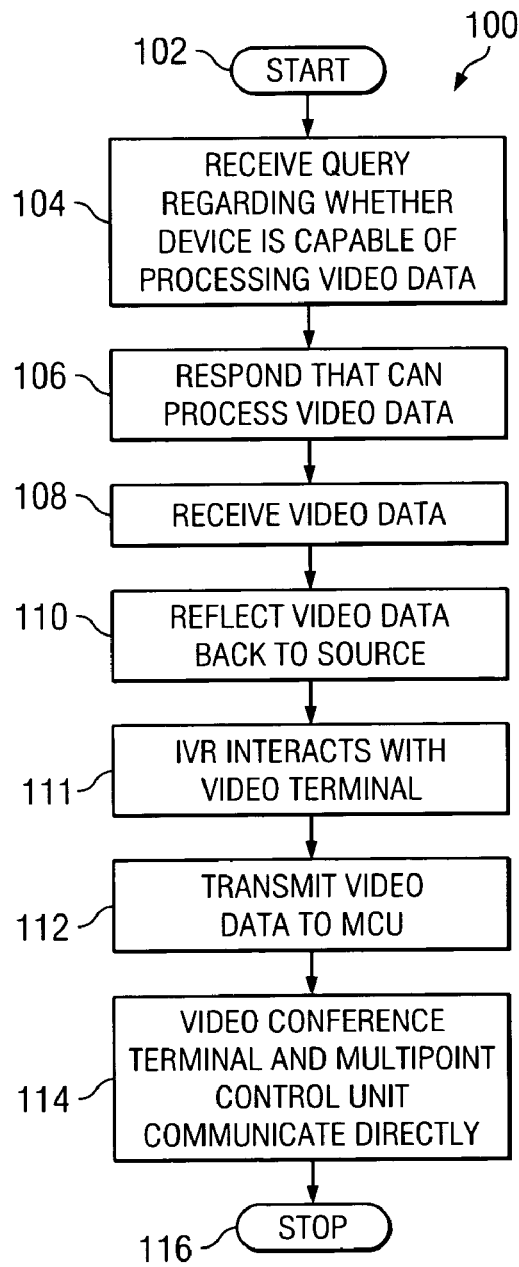
FIG. 2 is a flow chart illustrating a method for maintaining video connectivity.

FIG. 2 is a flowchart illustrating a method 100 for maintaining video connectivity according to the teachings of the invention. With reference to FIGS. 1A-2, operation of system of FIG. 1A is described. Method 100 begins at step 102. At step 104, IVR 18 receives a query from video conference terminal 12 guarding whether IVR 18 is capable of processing video data. Such query may take the form of an SDP m line in a SIP message, or an H.245 capability set in H.323; however, any suitable query may be utilized. In addition, according to some embodiments, no query is utilized. At step 106, IVR 18 responds back to video conference terminal 12 indicating that it is capable of processing video data. This indication may occur in the context in which IVR 18 is truly capable of processing video data, or alternatively, IVR (or other device) may be incapable of processing video data.

At step 108, IVR receives video data in the form of a plurality of packets, such as packet 28. In order for video conference terminal 12 may receive video data prior to receiving video data directly from multipoint control unit 16, IVR 18 reflects back the video data contained in packets 28, as packets 30, to video conference terminal 12, as indicated at step 110. In one embodiment, this reflection back involves modifying the RTP SSRC field 50, the time stamp 48, and the sequence number fields 46. The RTP SSRC field 50 is modified with a previously allocated, unique SSRC value, in such a fashion that there is a one-to-one mapping between any SSRC received by the reflector and the substitution value that was previously allocated. The intention is that the SSRC be the same for all packets in the reflected stream, but different than the inbound SSRC. In addition, the source address 40 and the destination address 42 are reversed, as indicated by reference numeral 52 resulting in transmission of packet 30 back to video conference terminal 12. Thus, a user of video conference terminal 12 receives the same image that is transmitted to IVR 18. This is advantageous at least because it provides a simple method for providing video data to video conference terminal 12 that is not resource intensive and avoids the termination of video capability that might otherwise occur if video conference terminal 12 did not receive video data back.

At step 111, IVR 18 interacts with the video terminal 12 to gather information that will allow it to transfer the call to the proper MCU resources 16. This information is prompted-for using a voice channel that flows from the IVR to the video terminal. The video terminal sends responses in the form of voice or DTMF from the video terminal back to the IVR. At step 112, IVR 18 transfers the voice, video, and other data streams from the IVR to an appropriate MCU, using the native signaling associated with the video call (e.g. SIP or H.323). Following this transfer, video data in payload 38 of packets 28 flows in between the terminal 12 and the MCU 16. When multipoint control unit 16 receives data from another video conference terminal, multipoint control unit 16 may transmit this information, and possibly the video data information contained in payload 38 of packets 28, back to video conference terminal over link 24. This may involve conventional processing of video packets, including decoding each packet, rasterizing and composing video image representative of the video data from a plurality of video conference terminals 12, 14, recompressing the data into packet form, and transmitting out to the destination. When video conference terminal 12 receives such video data, the packets 30 returned from IVR 18 may be terminated, without destroying the video connectivity capability of video conference terminal 12.

Thus, a method and system are provided that allow a video conference terminal, or other video terminal, to maintain video connectivity that does not require extensive resources. It will be understood that the teachings of the invention are applicable to devices other than IVRs, and that the transmission of video data directly back to its source without modification of the payload may be utilized in other contexts. In one example context, the reflection back of the video data occurs, even though the reflecting device is capable of processing video data. In this context, a reflection back may maintain the video connectivity without requiring the use of resources conventionally needed to decompress, rasterize, compose, and recompress video data for transmission to the receiving terminal. In addition, the teachings of the invention are applicable to uses in IVRs that are not utilized in video conferencing environments.

Figure 4:
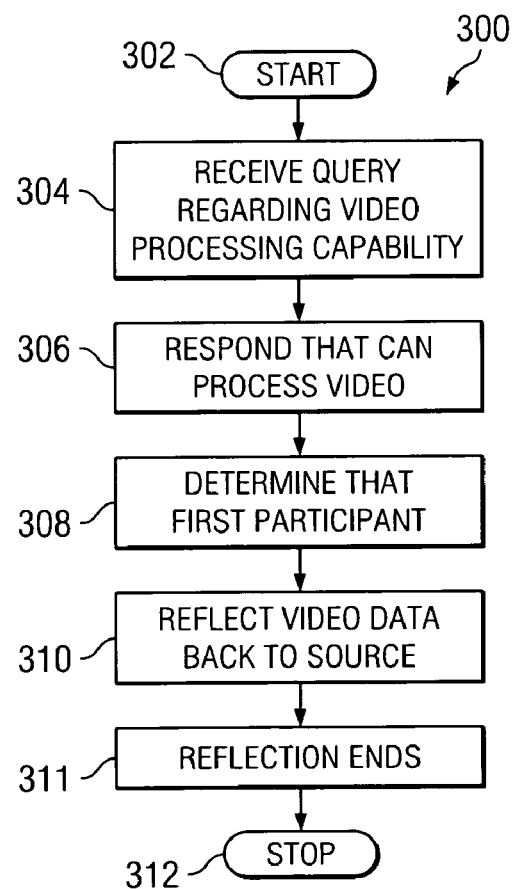
FIG. 4 is a flow chart illustrating a method for maintaining video connectivity in the multi-point control unit of FIG. 3A.
Figure 3A:
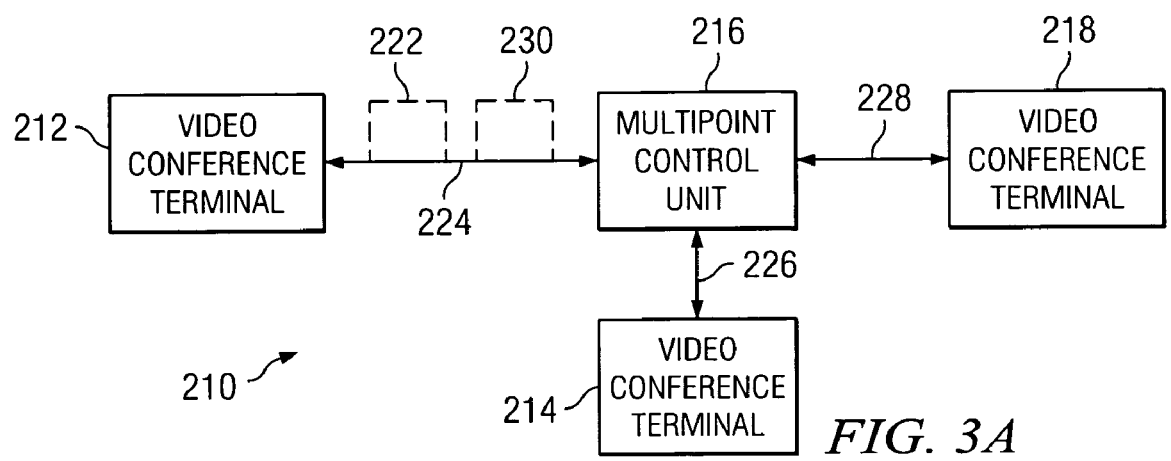
FIG. 3A is a schematic diagram illustrating an alternative embodiment of the invention.

FIGS. 3A-4 are associated with an alternative embodiment of the invention involving a multipoint control unit. FIG. 3A is a schematic diagram illustrating a system 210 according to an alternative embodiment of the invention. System 210 is analogous to system 10 of FIG. 1 except that no IVR is illustrated. Rather, the plurality of video conference terminals 212, 214, and 218 are illustrated as well as a multipoint control unit 216. Video conference terminals 212, 214, and 218 may be analogous to those described above in conjunction with FIG. 1. Multipoint control unit 216 is analogous to multipoint control unit 16 described above in connection with FIG. 1.

Figure 3B:
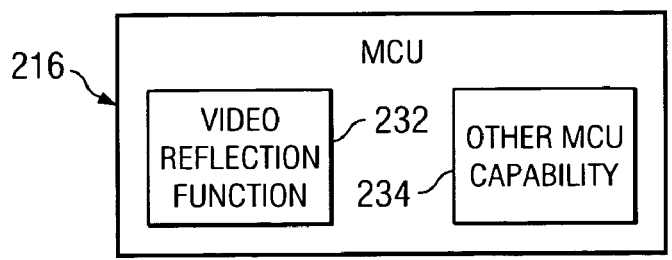
FIG. 3B is a block diagram illustrating a multi-point control unit of FIG. 3A.

According to this embodiment of the invention, multipoint control unit 216 determines that a participant associated with video conference terminal 212 is the first participant in a video conference that will involve a plurality of participants. Rather than display a blank screen to participant 212 or, alternatively processing the received video data and composing a new video image which is packetized and transmitted back to video conference terminal 112, the received video packets are simply reflected back to video conference terminal 212 in an analogous manner to that described above in conjunction with FIGS. 1A-2. In particular, packets 222 having a header and a packet, such as described above in conjunction with FIG. 1C, are received, and in response to determining that video conference terminal 212 is associated with a first participant to a video conference, this information is simply reflected back to video conference terminal 212. This allows the user to see himself on the associated display. This reflection is done, in one example, by modifying the associated header fields of packet 220, including switching the source address with the destination address, and by transmitting the result back as a new packet 230 with the video data unmodified. Once participants associated with video conference terminal 214 and/or 218 join the video conference, packets 230 may be replaced with packets representative of a composed or switched video image, which may include video data from video conference terminals 214 and 218. FIG. 3B is a block diagram illustrating an example of multipoint control unit 216. In this example, multipoint control unit 216 includes a video reflection function 232 and other multipoint control unit capability block 234. Video reflection functionality block 34 performs the functions described herein associated with reflecting back to a user the video data received from the user. Other multipoint unit capability function 234 performs the other functions associated with a multipoint control unit.

FIG. 4 is a flowchart illustrating example steps associated with a method of maintaining video connectivity in the system of FIG. 3A. Method 300 begins at step 302. At step 304, multipoint control unit 216 receives a query regarding the video processing capability of multipoint control unit 216. As described above in the context of method 100 of FIG. 2, this query may alternatively be omitted. At step 306, multipoint control unit 216 responds that it is capable of processing video data. As with the method of FIG. 4, if the query is omitted, the response may also omitted. At step 308, a determination is made by multipoint control unit that a participant attempting to join a video conference is the first participant. In response to making this determination the video data contained in packets received from the first participant are reflected back to the source of the packets, which in this example is video conference terminal 212. At step 311, the reflection ends when a second video stream enters the conference. Subsequent video processing occurs according to the algorithms of the native MCU. The method concludes at step 312.

Thus, according to this embodiment of the invention, resources associated with a video conference multipoint control unit may be conserved by reflecting back video data received in order to provide a user a visual indication that the video conferencing is operating properly. Further, this reflection may be useful in maintaining video connectivity in the case where video data would not normally be transmitted back. In addition, this transmission of video data may occur without the multipoint control unit utilizing resources to decode video data, recompose and rasterize video data based upon the decoded information, and recoding it for transmission of packets.

In an alternative embodiment, video reflection may be used to maintain video connectivity of particular participants engaging in a "break-out" session. In such a case, each participant engaging in a break-out session receives a reflection of himself in order to maintain video connectivity while the other participants of the video conference receive standard video (without the break-out session participants). This allows break-out participants to maintain video connectivity without demanding too many resources from the video conferencing facility.

Although the present invention has been described with several embodiments, a myriad of changes, variations, alterations, transformations, and modifications may be suggested to one skilled in the art, and it is intended that the present invention encompass such changes, variations, alterations, transformations, and modifications as they fall within the scope of the appended claims.

What is claimed is:

1. A video conferencing system comprising:
   an interactive voice response system operable to:
      transmit and receive packets;
      automatically query a user and respond to a response to the query;
      detect a query from a video conference terminal regarding whether the interactive voice response system is capable of communicating video data;
      respond to the query by indicating the interactive voice response system is capable of processing video data even if the interactive voice response system is not capable of processing video data;
      detect receipt by the interactive voice response system of a first plurality of packets representative of video data from a video conference terminal, each of the first plurality of packets comprising a header and a payload; and
      reflect back to the source a copy of the first plurality of packets representative of the video data, each packet of the copy having a modified header and an unmodified payload;
   a multipoint control unit operable to perform one or more of the following of:
      receive and decode a second plurality of packets representative of video data;
      encode and transmit data representative of the video data based at least in part on the decoded second plurality of packets;
      encode the data representative of the video data; and
      transmit a third plurality of packets representative of the video data to the video conference terminal; and
   the video conference terminal comprising a camera and operable to:
      produce data representative of an image captured by the camera and produce the first plurality of packets in response;
      transmit the first plurality of packets to the interactive voice response system;
      render a video image on a display in response to receiving the third plurality of packets representative of video data transmitted by the multipoint control unit; and
      render a video image on a display representative of the image captured by the camera in response to receiving the reflected copy of the first plurality of packets.

2. The video conferencing system of claim 1, wherein the interactive voice response system is further operable to transmit and receive Real-time Transport Protocol (RTP) packets.

3. The video conferencing system of claim 1, wherein the interactive voice response system is further operable to transmit and receive packets according to H.323 protocol.

4. The video conferencing system of claim 1, wherein the interactive voice response system is further operable to transmit and receive packets according to Request for Comment (RFC) 3261 or 3264 protocol.

5. The video conferencing system of claim 1, wherein the plurality of packets comprise an Real Time Protocol Synchronization Source (RTP SSRC) field, a timestamp field, a sequence number field, an Internet Protocol (IP) source address, and a destination address.

6. The video conferencing system of claim 5, wherein the interactive voice response system is operable to reflect back to the video conference terminal a copy of the packets representative of voice data by:
   modifying the RTP SSRC, timestamp, and sequence number fields;
   reversing the IP source and destination addresses; and
   transmitting the copy without decoding the payload of the received packets.

7. The video conferencing system of claim 1, wherein the interactive voice response system comprises software encoded in a computer-readable medium.

8. A method for maintaining video connectivity comprising:
   transmitting a message from a device to a video source, the message indicating that the device is capable of processing video data even if the device is not capable of processing video data in order to deceive the video source into believing that the device is capable of processing video data and to prevent the video source from disabling its own video capability;
   receiving at the device from the video source a plurality of packets representative of video data, the plurality of packets comprising a payload and a header;

transmitting a copy of the plurality of received packets back to the video source with a modified header and an unmodified payload; and wherein the transmitted copy provides data representative of the video data.

9. The method of claim 8, and further comprising:

receiving at the device from the video source a query regarding whether the device is capable of processing the video data; and wherein the message to the video conference terminal comprises a response to the query indicating the device is capable of processing video data even if the device is not capable processing video data.

10. The method of claim 8, wherein the device is incapable of decoding and encoding the payload portion of a plurality of packets representative of the video data.

11. The method of claim 8, wherein the device is an interactive voice response system.

12. The method of claim 8, further comprising determining that the plurality of received packets are received from a first participant in a video conference before transmitting the plurality of received packets back to the video source.

13. The method of claim 12, and further comprising transferring received packet streams from the interactive voice response system to a multi-point control unit.

14. The method of claim 8, wherein transmitting a copy of the plurality of received packets comprises transmitting a copy of the plurality of received packets while the device exchanges audio data between a portion of a plurality of participants in a video conference that are engaged in a break-out session.

15. The method of claim 8, wherein the plurality of packets are RTP packets.

16. The method of claim 8, wherein receiving the plurality of packets comprises receiving the plurality of packets based on establishing the packet stream according to RFC 3261 or RFC 3264 protocol.

17. The method of claim 8, wherein the plurality of packets comprise an RTP SSRC field, a timestamp field, a sequence number field, an IP source address, and a destination address.

18. A method for maintaining video connectivity comprising:

receiving at a device from a source a plurality of packets representative of video data, the plurality of packets comprising a payload and a header;

transmitting a copy of the plurality of received packets back to the source with a modified header and an unmodified payload; and wherein the transmitted copy provides data representative of the video data;

wherein the plurality of packets comprise an RTP SSRC field, a timestamp field, a sequence number field, an IP source address, and a destination address; and wherein transmitting a copy of the plurality of received packets comprises:

modifying the RTP SSRC, timestamp, and sequence number fields;

swapping the IP source and destination addresses; and transmitting the copy without decoding the payload of the received packets.

19. An apparatus for facilitating video communication comprising:

an interactive voice response system operable to transmit and receive packets and further operable to automatically query a user and respond to a response to the query; and wherein the interactive voice response system is further operable to:

transmit a message from the interactive voice response system to a video conference terminal, the message indicating that the interactive voice response system is capable of processing video data even if the interactive voice response system is not capable of processing video data;

detect receipt by the interactive voice response system of packets representative of video data from a source, the packets comprising a header and a payload; and reflect back to the source a copy of the packets representative of video data with a modified header and an unmodified payload.

20. The apparatus of claim 19, wherein the interactive voice response system is further operable to:

detect a query regarding whether the interactive voice response system is capable of communicating video data; and respond wherein the message from the interactive voice response system comprises a response to the query by indicating that the interactive voice response system is capable of processing video data even if the interactive voice response system is not capable of processing video data.

21. The apparatus of claim 19, wherein the interactive voice response system is incapable of decoding and encoding a plurality of packets representative of a video image.

22. The apparatus of claim 19, wherein the interactive voice response system is further operable to transfer the received packet streams from the interactive voice response system to a multipoint control unit with a modified header.

23. The apparatus of claim 19, wherein the interactive voice response system is further operable to transmit and receive RTP packets.

24. The apparatus of claim 19, wherein the interactive voice response system is further operable to transmit and receive packets according to H.323 protocol.

25. The apparatus of claim 19, wherein the interactive voice response system is further operable to transmit and receive packets according to SIP protocol.

26. The apparatus of claim 19, wherein the plurality of packets comprise an RTP SSRC field, a timestamp field, a sequence number field, an IP source address, and a destination address.

27. The apparatus of claim 26, wherein the interactive voice response system is operable to reflect back to the source a copy of the packets representative of voice data by:

modifying the RTP SSRC, timestamp, and sequence number fields;

reverse the IP source and destination addresses; and transmitting the copy without decoding the payload of the received packets.

28. The apparatus of claim 19, wherein the interactive voice response system comprises software encoded in media.

29. An apparatus for facilitating video communication, the apparatus configured to:

transmit a message from a device to a video source, the message indicating that the device is capable of processing video data even if the device is not capable of processing video data in order to deceive the video source into believing that the device is capable of processing video data and to prevent the video source from disabling its own video capability;

receive at the device from the video source of a plurality of packets representative of video data, the plurality of packets comprising a payload and a header; and transmit a copy of the plurality of received packets back to the video source with a modified header and an unmodified payload.

30. The apparatus of claim 29, wherein the apparatus is further configured to:
receive at the device from the video source a query regarding whether the device is capable of communicating video data; and
wherein the message comprises a response to the query, the response indicating that the device is capable of processing video data even if the device is not capable of processing video data.

31. The apparatus of claim 29, wherein the device is incapable of decoding and encoding a plurality of packets representative of the video data.

32. The apparatus of claim 29, wherein the device is an interactive voice response system.

33. The apparatus of claim 29, and further comprising:
determining that the plurality of received packets are received from a first participant associated with the video source in a video conference before transmitting the plurality of received packets back to the video source.

34. The apparatus of claim 32, and further comprising transferring received packet streams from the interactive voice response system to a multipoint control unit.

35. The apparatus of claim 29, wherein the plurality of packets are RTP packets.

36. The apparatus of claim 29, wherein receiving the plurality of packets comprises receiving the plurality of packets according to H.323 protocol.

37. The apparatus of claim 29, wherein receiving the plurality of packets comprises receiving the plurality of packets according to SIP protocol.

38. The apparatus of claim 29, wherein the plurality of packets comprise an RTP SSRC field, a timestamp field, a sequence number field, an IP source address, and a destination address.

39. The apparatus of claim 38, wherein transmitting a copy of the plurality of received packets comprises:
modifying the RTP SSRC, timestamp, and sequence number fields;
swapping the IP source and destination addresses; and
transmitting the copy without decoding the payload of the received packets.

40. The apparatus of claim 29, wherein the apparatus comprises logic encoded in computer-readable medium.

41. An apparatus for facilitating video communication comprising:
means for transmitting and receiving packets and for automatically querying a user and responding to a response to the query; and
means for:
detecting a query regarding whether the interactive voice response system is capable of processing video data;
responding to the query by indicating that the interactive voice response system is capable of processing video data even if the device is not capable of processing video data;
detecting receipt by the means for transmitting and receiving of packets representative of video data from a source, the packets comprising a header and a payload; and
reflecting back to the source a copy of the packets representative of video data with a modified header and an unmodified payload.

* * * * *